United States Patent [19]

Otomo et al.

[11] 4,074,232

[45] Feb. 14, 1978

[54] DATA SENDING AND RECEIVING SYSTEM FOR PACKET SWITCHING NETWORK

[75] Inventors: Koju Otomo; Takeshi Itoh, both of Musashino; Kazuyuki Hayashi, Yokohama; Hiroshi Omoto; Takayuki Yui, both of Tokyo; Makoto Suzuki, Kawasaki, all of Japan

[73] Assignees: Hitachi, Ltd.; Nippon Telegraph and Telephone Public Corporation; Oki Electric Industry Co., Ltd.; Nippon Electric Company, Ltd.; Fujitsu Limited, all of Japan

[21] Appl. No.: 663,048

[22] Filed: Mar. 2, 1976

[30] Foreign Application Priority Data

Mar. 3, 1975 Japan ............................ 50-25007

[51] Int. Cl.² .................................................. H04Q 9/00
[52] U.S. Cl. ...................................... 340/147 R; 178/3; 179/15 BV; 179/15 BA; 340/146.1 BA
[58] Field of Search ............... 340/146.1 BA, 147 R, 340/147 C; 179/15 AT, 18 EA, 15 BV, 15 BA; 178/3

[56] References Cited

U.S. PATENT DOCUMENTS 3,749,845  7/1973  Fraser ..................... 179/18 EA
3,925,601  12/1975  Cardwell et al. ............... 178/3
3,988,545  10/1976  Kuemmerle et al. ......... 179/15 AT Primary Examiner—Donald J. Yusko
Attorney, Agent, or Firm—Craig & Antonelli

[57] ABSTRACT

A packet switching network in which the data transmitted from a data sending terminal is temporarily stored in a packet switching exchange connected to a data sender where the data is divided into a plurality of units each of which is called a packet and the data in turn is transferred with each packet unit to a packet switching exchange connected to a data receiver, through a number of transmit switching exchanges, and then those packets are reassembled into the original format of the data which finally is transmitted to a data receiving terminal, the above-mentioned packet switching network employing a data sending and receiving system in which a character oriented transmission control procedure for communicating with its associated terminals is used in the packet switching network, and the packet switching network involves data terminals each having a single communication link connected with the packet switching network, whereby the data sending and receiving system is effectively effected and a flow control for the switching network can be achieved without using any special procedure in the control.

3 Claims, 10 Drawing Figures

DATA SENDING AND RECEIVING SYSTEM FOR PACKET SWITCHING NETWORK

FIELD OF THE INVENTION

Recently attention has been given to a packet switching network belonging to the store and forward stitching network, for economically providing data communication service.

The packet switching network is briefly summarized as follows: The data transmitted from a data sending terminal (hereinafter referred simply to as a sending terminal) is temporarily stored in the packet switching exchange connected to a data sender (hereinafter referred simply to as a sending station) where the data received is divided into a plurality of data units each called a packet which in turn are transmitted in the packet form through a number of transmit switching exchanges up to the packet switching exchange connected to a data receiver (hereinafter referred simply to as a receiving station); at the receiving station, the packet units are reassembled into the original format of the data which finally is transmitted to a data receiving terminal (hereinafter referred to simply as a receiving terminal).

The present invention relates to a data sending and receiving system for a packet switching network which employs a character oriented transmission control procedure for data communication with its associated terminals and involves data terminals each having a single communication link between the packet switching network and the data terminals.

BRIEF DESCRIPTION OF THE DRAWINGS

FIGS. 2A and 2B show block diagrams of the packet exchange as an example for realizing the data sending and receiving system shown in FIG. 1, in which FIG. 2A is a block diagram of a packet exchange at the sending station and FIG. 2B a block diagram of a packet exchange at the receiving station.

FIGS. 4A and 4B show block diagrams of the packet exchange of an example for realizing the data sending and receiving system shown in FIG. 3, in which FIG. 4A is a block diagram of the packet exchange at the sending station and FIG. 4B a block diagram of the packet exchange at the receiving station.

FIGS. 6A and 6B are block diagrams of the packet exchange of an example for realizing the flow-control system of FIG. 5, in which FIG. 6A is the packet exchange at the sending station and FIG. 6B is the packet exchange at the receiving station.

DESCRIPTION OF THE PRIOR ART

As mentioned above, in the packet switching network, the data transmitted from the data sending terminal is temporarily stored in the packet switching exchange connected to a data sender where the data received is divided into a plurality of data units each called a packet. The received data is transmitted in packet format through a number of transmit switching exchanges up to the packet switching exchange connected to a data receiver. At the receiving station, the packets of data are reassembled into the original format of the data which in turn is transmitted to the data receiving terminal. Such packet switching system is detailed in "The Interface Message-processor for the ARPA Computer Network" in the AFIPS Conference Proceedings, Vol. 36, June 1970, pp. 551 to 567, and in "Improvements in the Design and Performance of the ARPA Network" in The AFIPS Conference Proceedings, Vol. 41, December 1972, pp. 741 to 745, etc.

Figure 1:
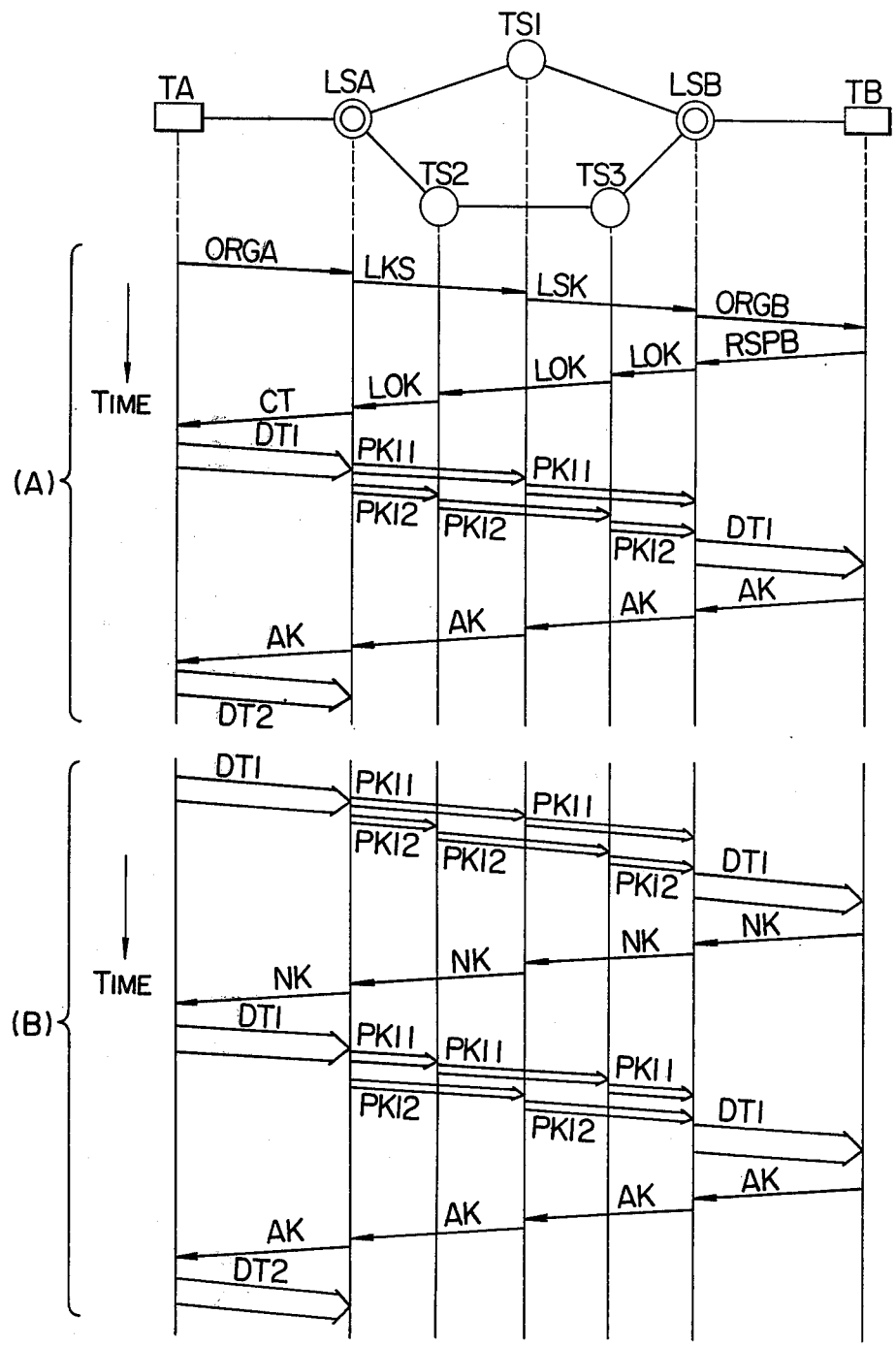
FIG. 1 shows a data flow-chart illustrating a conventional data sending and receiving system for a packet switching network.
Figure 2A:
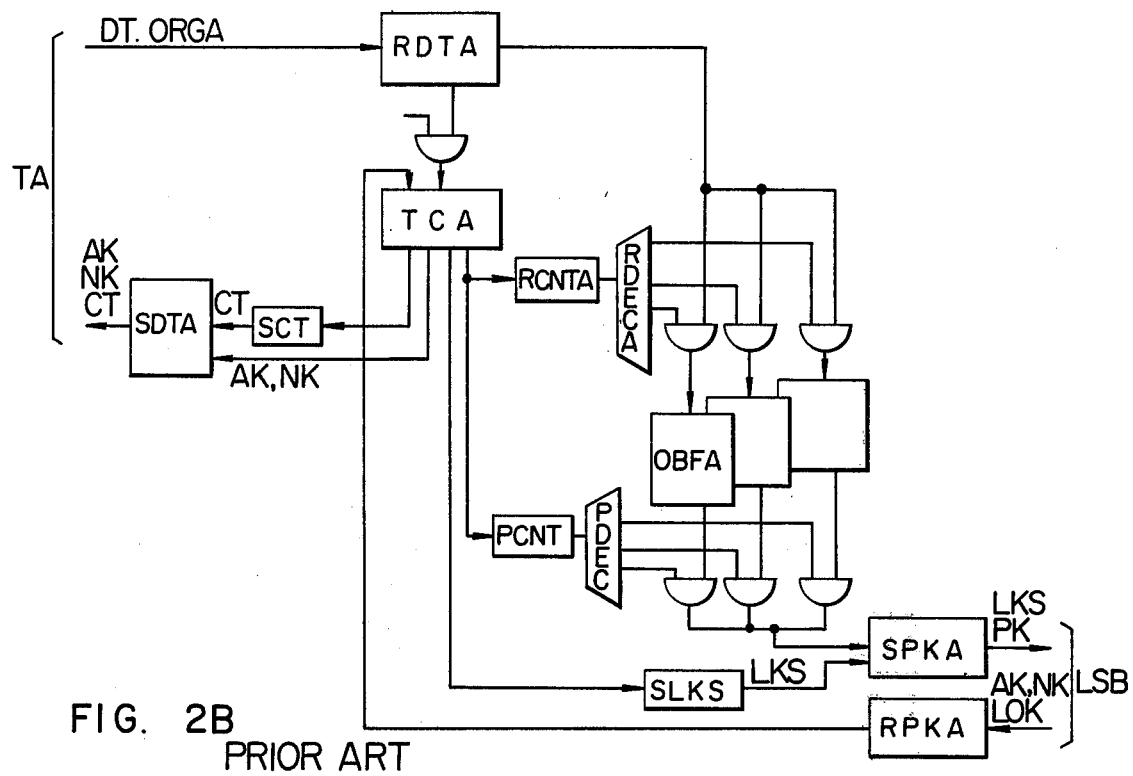
Figure 2B:
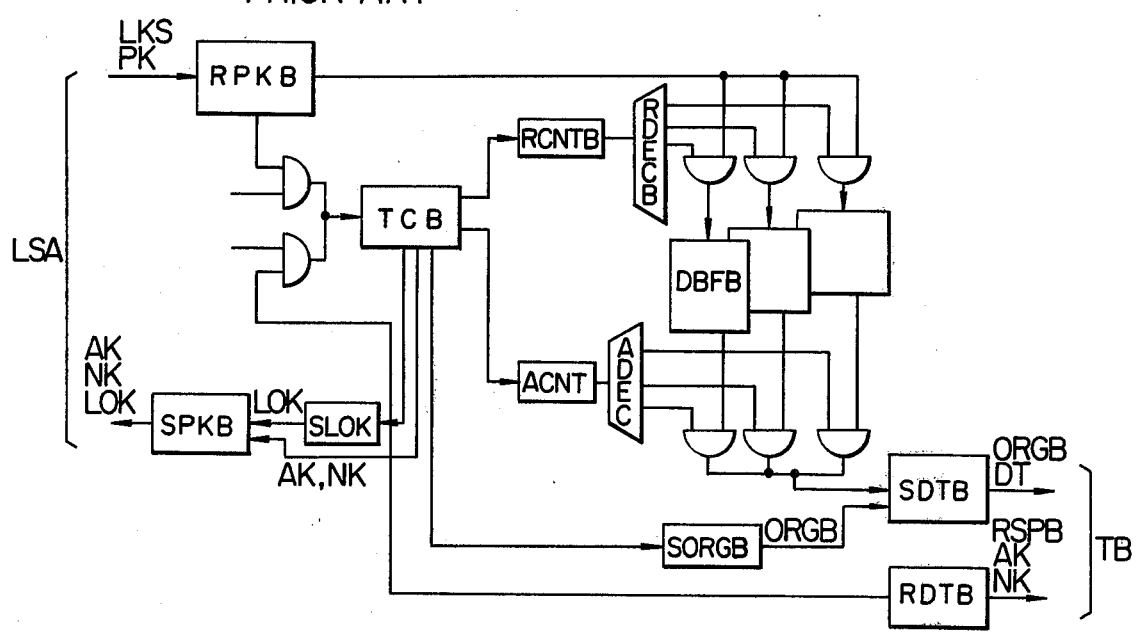

A conventional data sending and receiving system will briefly be referred to with reference to FIGS. 1, 2A and 2B.

As shown in FIG. 1(A), when a sending station LSA receives a call originating signal ORGA transmitted from a sending terminal TA, the call originating signal ORGA is detected by a transmission control TCA as shown in FIG. 2A, and, in response to the detection, a send data counter RCNTA and a packet assembly counter PCNT are reset. At this time, a link establishing signal sender SLKS permits a link establishing signal LKS to be transmitted to a receiving station LSB. Upon receiving the link establishing signal LKS, the receiving station LSB permits a call signal sender SORGB to send a call signal ORGB to a receiving terminal TB. Then, when the receiving station LSB receives an answer signal from the receiving terminal TB, the communication link between the sending and receiving terminals TA and TB is ready for establishing the communication link. Under this condition, a received packet counter RCNTB and a data assembly counter ACNT are reset for receiving a packet PK11 from the sending station LSA, and a link establishing ready signal sender SLOK issues a link establishing ready signal LOK to the sending station LSA. Upon receiving the link setting ready signal LOK, the sending station LSA drives a communication ready signal sender SCT as shown in FIG. 2A to transmit a communication ready signal CT to the sending terminal TA, thereby resulting in establishing the communication link between the sending terminal TA and the receiving terminal TB. After establishing of such communication link, data DT1 transmitted from the transmitting terminal TA is divided into packets PK11 and Pk12 which in turn are delivered PK12 an optimum routes selected at that time, respectively. In the case of FIG. 1, the packet PK11 is routed to the receiving station LSB, through a switching office TS1, and the packet PK12 is routed through switching offices TS2 and TS3 to the receiving station LSB. The receiving station LSB reassembles the received packets PK11 and Pk12 into the original format of the data DT1 which in turn is sent to the receiving terminal TB. On the other hand, the receiving terminal TB issues a correct checking answer AK indicating that the received data DT1 is correct or an incorrect checking answer NK indicating that the received data DT1 is erroneous. The receiving station LSB receives these checking answers AK or NK and modifies them to the packet form.

Through the optimum routes selected at that time, these packets are returned back to the sending station LSA, through the switching office TS1. In this manner, the checking answer AK or NK from the sending station LSA is transmitted to the sending terminal TA through a single communication link. The sending terminal TA transmits a next data DT2 or the same data DT1 again in accordance with the checking answer AK or NK, respectively. In such a data transmission system, the data are transferred after temporary storage in respective switching stations, so that a delay in the data transmission system in the switching network is larger than that in the network without data storing function such as the hybrid switching network. In conventional data transmissions systems, there are inherent transmission delays in the switching network due to the data DT1 and the correct receipt checking answer AK for the data DJ1 or the incorrect receipt checking answer NK for the same. Such transmission delays cause the data DT2 following the data DT1 to be delayed in transmission operation. Particularly, in low rate communication between character terminals without using computers, a reduction in the effective data transmission efficiency is remarkable.

As shown in FIG. 1, the correct or incorrect receipt checking answer AK or NK from the receiving terminal TB is transmitted through the switching network to the sending terminal TA, so that the traffic in the switching network increases.

As shown in FIG. 1(B), even when errors occur in the data DT1 from the sending terminal TA on the transmission line between the sending terminal TA and the sending station LSA, the erroneous data DT1 is transmitted through the switching network, although it is incorrect to the receiving terminal TB. For this, the various resources in the switching network are wastefully used and thus the data processing ability of the switching network is considerably deteriorated. For the sending terminal TA, the error restoring time is elongated, thus resulting in deterioration of the data transmission efficiency.

SUMMARY OF THE INVENTION

An object of the present invention, is to provide a data sending and receiving system for a packet switching network with an improvement in the data transmission efficiency of the communication between character terminals of the packet switching network.

Another object of the present invention is to provide a data sending and receiving system for a packet switching network without any special procedure taken for the flow control of the packet switching network made to the sending and receiving terminals, and without increasing additional signals required for performing the flow control operation.

DESCRIPTION OF THE PREFERRED EMBODIMENTS

Figure 3:
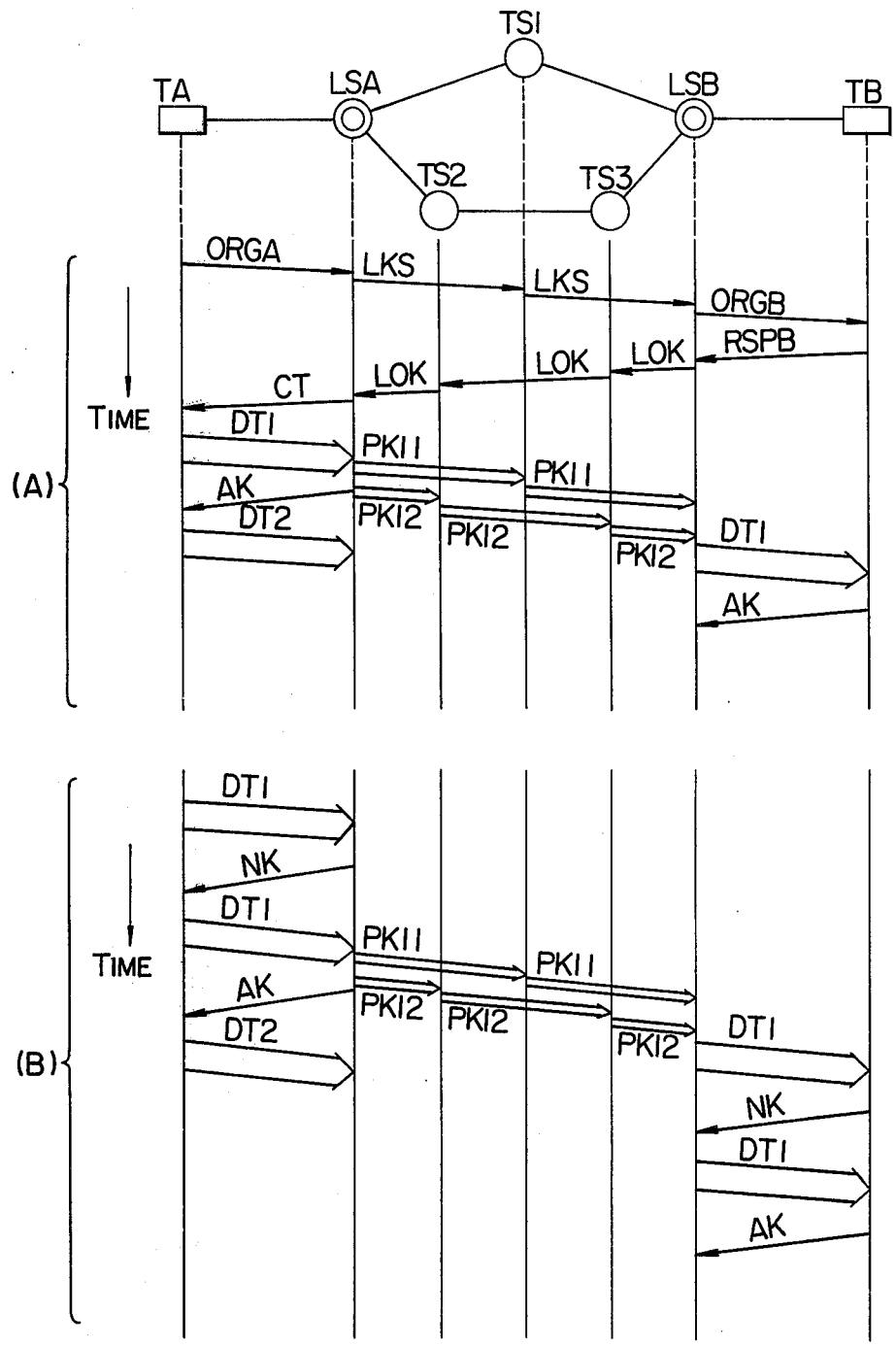
FIG. 3 shows a data flow-chart illustrating the sending and receiving of data of a packet switching network of an embodiment according to the present invention.
Figure 4A:
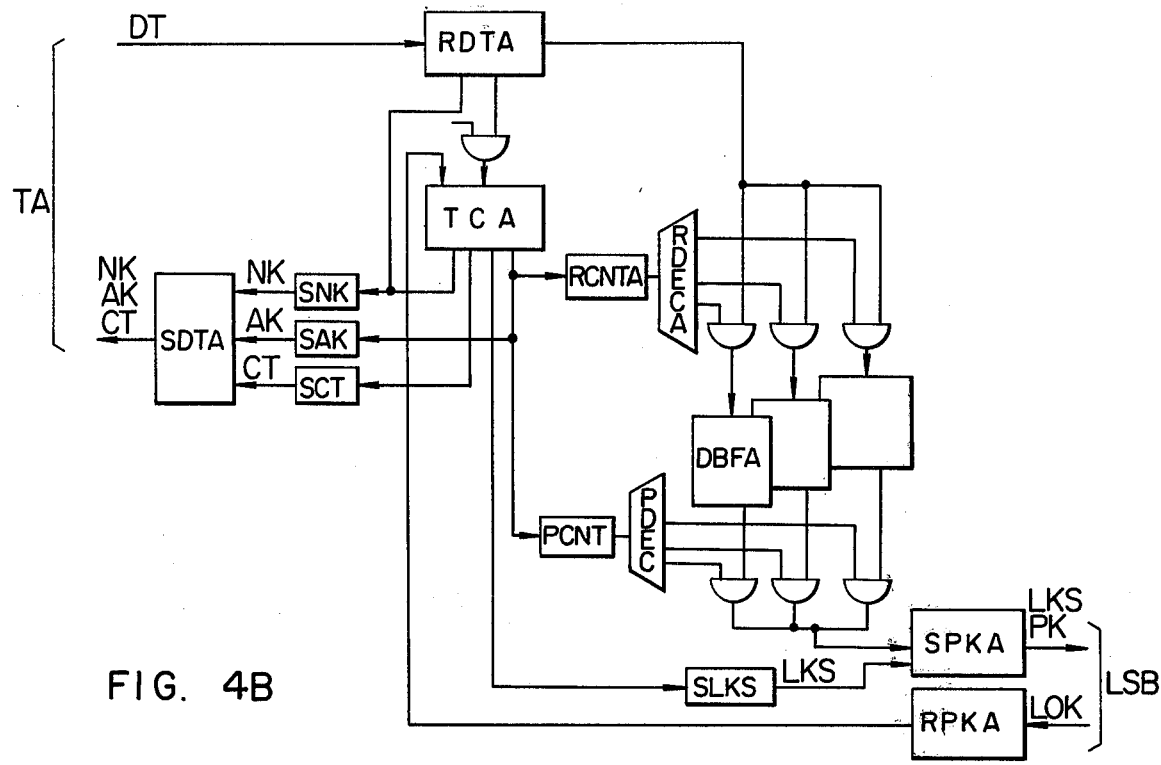
Figure 4B:
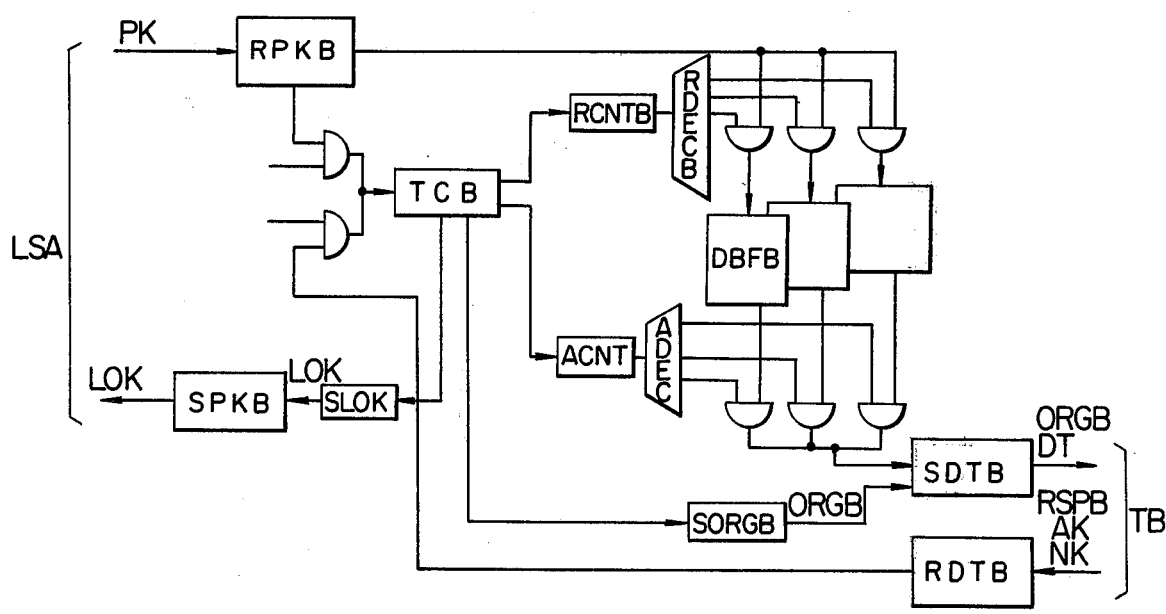

The present invention will be described in detail with reference to embodiments as shown in FIGS. 3 and 4.

As described in connection to FIG. 1(A), after the communication link is established between the sending and receiving terminals TA and TB, a data receiver RDTA receives data DT1 sent from the sending terminal TA. Then, a transmission controller TCA picks up the error control part from the information for transmission control procedure included in the information of the data DT1 for discriminating whether the data DT1 is correct or not. If the data DT1 includes an error, the data DT1 is cleared in the data receiver RDTA and further an incorrect receipt checking answer NH is issued from the incorrect receipt checking answer sender SNK. On the other hand, if the data is correct, the received data counter RCNTA is stepped to sequentially load the data DT1 in packet form into the buffer memory DBFA for storing the data therein. In response to the packet assembling counter PCNT, the packeted data PK11 and PK12 from the buffer memory DBFA is transmitted to the packet sender SPKA for further transmitting them to the receiving station LSB. At the same time, the correct receipt checking answer sender SAK is driven for transmitting the correct receipt checking answer AK to the sending terminal TA.

On the other hand, the receiving station LSB receives at the packet receiver RPKB the packets PK1 and PK2 received from the sending station LSA. Upon receipt of the packets, a received packet counter RCNTB is controlled to sequentially load the packets into the buffer memory DBFB, while at the same time the data which are to be assembled and included in the packets are transferred to the transmission controller TCB. When the transmission controller TCB detects a state that the income packets are insufficient in number to assemble the original format of the received data, the data assembling counter ACNT is controlled to permit the data store buffer memory DBFB to output necessary data to the data sender SDTB and finally the data DT1 is transmitted to the receiving terminal TB. Then, the checking answer from the receiving terminal TB is inputted to the transmission controller TCB for checking whether the data is correct or not. If the checking answer is the correct receipt checking answer AK, the data DT1 in the data transmitter SDTB is cleared. Conversely, if the checking answer is the incorrect receipt checking answer NK, the dsata DT1 in the data sender SDTB is again retransmitted back to the receiving terminal TB.

In brief, the present invention employs such a data sending and receiving system that, as shown in the data flow-chart of FIG. 3, the checking answer as to whether the data sent from the sending terminal TA are correct or not is produced from the transmitting station LSA, while the checking answer derived from the receiving terminal TB with respect to the data transmitting from the receiving station LSB to the receiving terminal TB is processed in the receiving station LSB. Therefore, it is unnecessary to transmit the checking answer into the switching network, which results in that the error restoring process may quickly be done, improvement is made of the effective transmission efficiency of data of the communication between the character terminals involved in the packet switching network, and the data processing ability of the packet switching network is enhanced.

An explanation will be made about the flow control which is the second feature of the present invention.

In general, a packet switching network permits communication between terminals of which the transmission speeds are different, since the data is temporarily stored in a buffer memory. Assuming now that the sending terminal TA in FIG. 3A is a high speed signal terminal, while the receiving terminal TB is a low speed signal terminal. In the case where data is transmitted from the high speed signal sending terminal TA to the low speed signal receiving terminal TB, the data waiting in the receiving station LSB involving the low speed signal receiving terminal TB remarkably increases due to the difference of the terminal rate. If no counter-measure for such situation is taken, many problems are produced, for example, as mentioned below. The first is that the buffer memory in the switching exchange is insufficient in memory capacity and thus the normal switching operation of the switching exchange is damaged. The second is that the buffer memory of the switching exchange is occupied by only the data transmission between the data terminals TA and TB and, hence, it is impossible to impartially use the resources of the packet exchange. It is for this reason that any countermeasure for resticting the amount of transmitting data must be taken to the data terminals TA and TB or between the packet exchanges. This is called the flow control in the switching exchange.

The second object of the present invention is to provide means for flow control in the packet switching network employing a data transmission system in which the checking answer to the data sent from the sending terminal is promptly returned to the sending terminal from the sending station.

Figure 5:
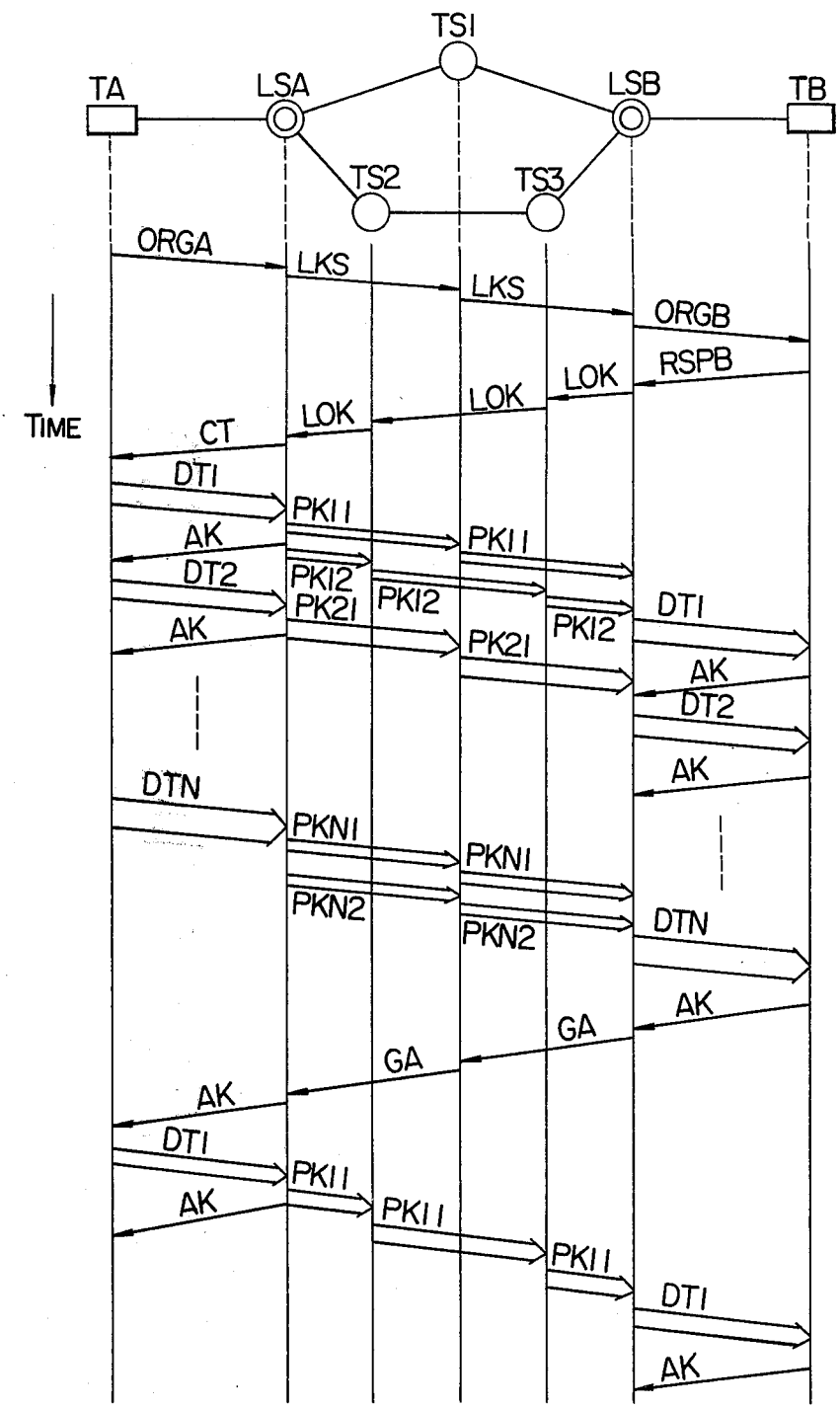
FIG. 5 is a data flow-chart for illustrating a flow-control in a packet switching network employing the data sending and receiving system according to the present invention.
Figure 6A:
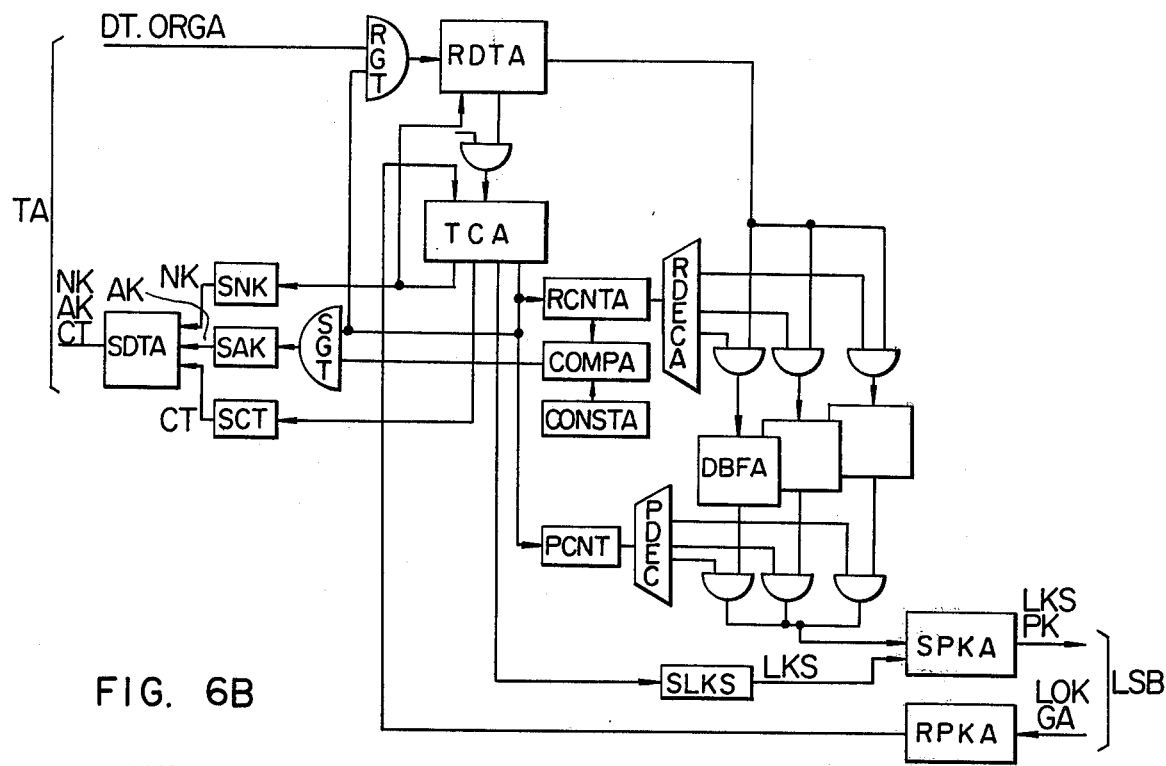

An embodiment of a flow control system according to the present invention will be given in reference with FIGS. 5 and 6.

Figure 6B:
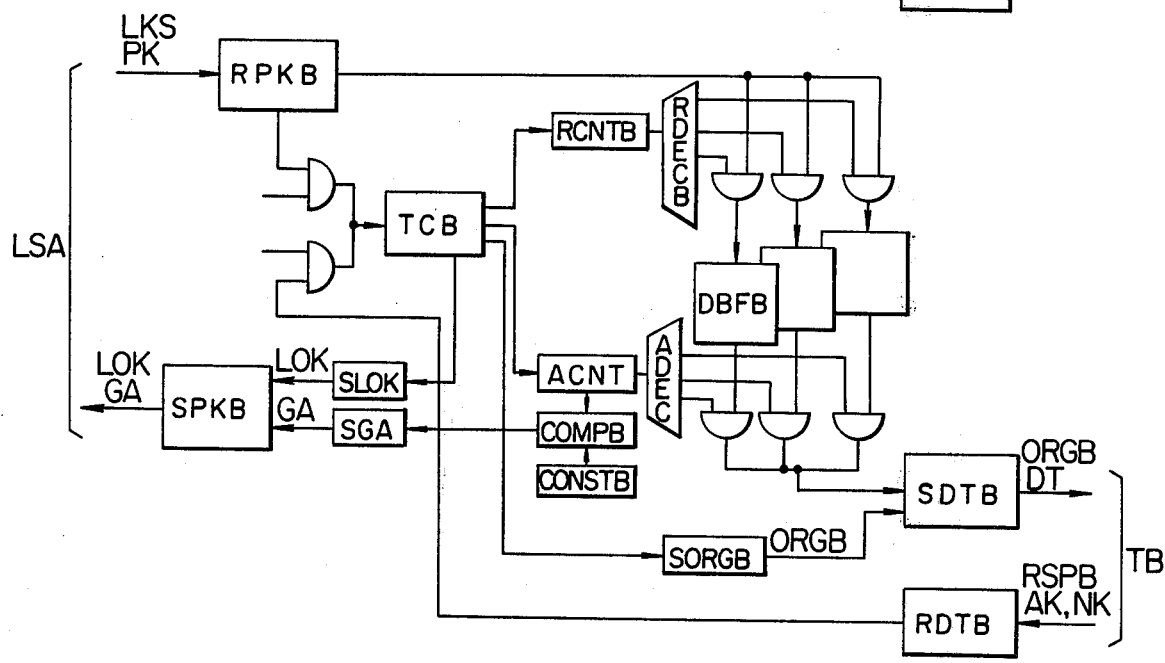

A communication link is first established between the sending and receiving terminal TA and TB, in the same manner shown in FIG. 1(A). At this time, as shown in FIG. 5, the link establishing signal LKS received which is transmitted from the sending station LSA is detected by the transmission controller TCB as shown in FIG. 6B, which at the same time if the data store buffer memory DBFB still remains the memory capacity sufficient to store the data of N(N being predetermined depending on the system employed), is memory capacity is reserved as the buffer memory for storing the data from the sending terminal TA. After establishment of the communication link, every time the sending station LSA receives the data from the sending terminal TA, the transmission controller TCA is driven to decide as to whether the received data is correct or not, and if the data is correct, the receiving data counter is driven. At this time, a comparator COMPA is driven to compare the content of the counter with a constant store CONSTA, and if the content of the received data counter RCNTA is below N-1, the correct receipt checking answer sender SAK (hereinafter referred simply to as a correct answer sender) sends a correct receipt checking answer AK (hereinafter referred simply to as a correctness answer) to the sending terminal TA. And the sending station is ready for the ensuing incoming data, while at the same time the packet assembling counter PCNT enables the data store buffer memory DBFA to sequentially deliver the received data in packet form to the packet sender SPKA and then to the receiving station LSB. From that time on, when the comparator COMPA detects a state that the content of the received data counter RCNTA of the sending station LSA reaches N, the correct answer sending gate SGT is disabled to prevent the correct answer sender SAK from issuing the correct answer AK to the sending terminal TA, while the data receiving gate RGT is disabled to inhibit the incoming of the ensuing data DT from the data sending terminal TA.

On the other hand, in the receiving station LSB having the packets received from the sending station LSA, these packets are assembled into the original format of the data which in turn are sequentially transmitted to the receiving terminal TB in response to the stepping operation of the data assembly counter ACNT. Upon receipt of the data, the receiving terminal TB transmits the correcr answer AK to the receiving station. In response to the correct answer, the data store buffer memory DBFB is made empty. Every time the receiving station LSB receives the correct answer AK from the receiving terminal TB, the comparator compares the content of the data assembly counter ACNT with the value (constant N) in the constant store. In this comparison, if these values coincide with each other, the data assembly counter ACNT is reset zero to enable the next data incoming ready signal sender SGA to send the next data incoming ready signal GA to the sending station LSA. The sending station LSA detects the next data input ready signal GA with the transmission controller TCA to reset the received data counter RCNTA zero and to enable the data receiver gate RGT and correct answer sending gate SGT, thereby to send the correct answer AK held in the sending terminal TA. This permits the sending terminal TA further to transmit the data of N in succession.

Figure 7:
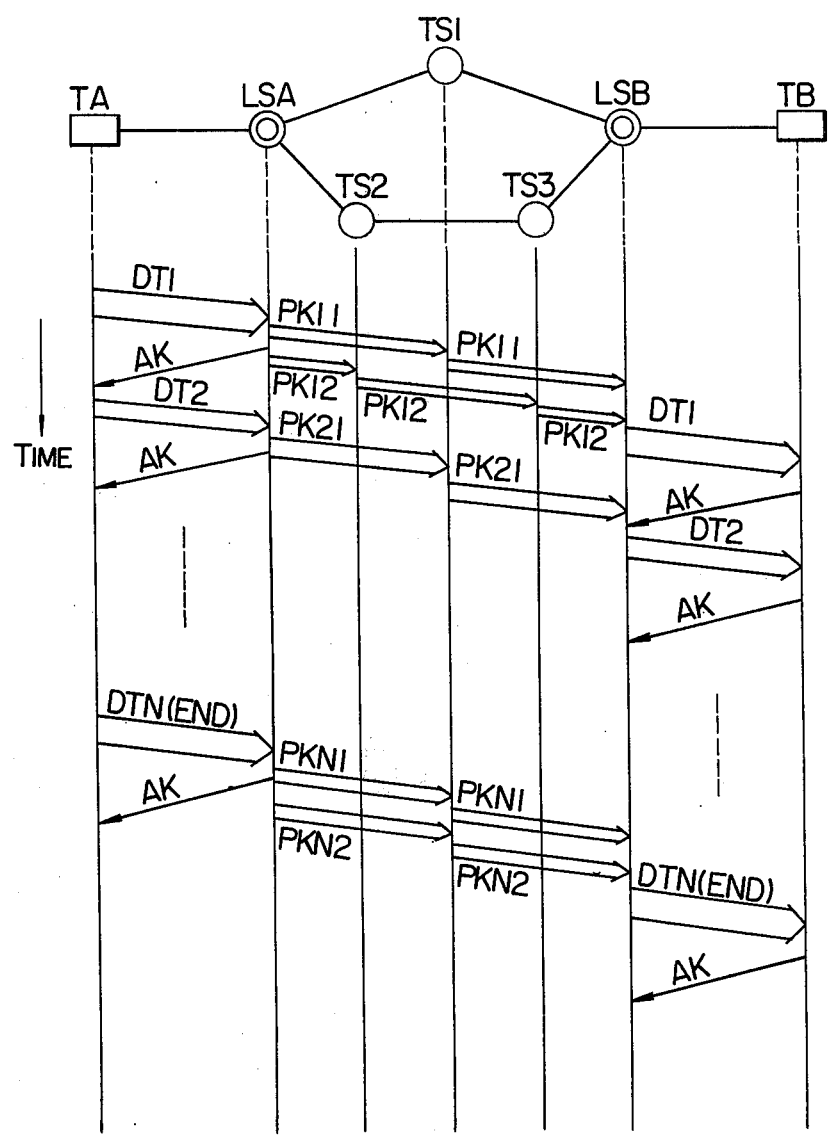
FIG. 7 shows a data flow chart illustrating the data sending and receiving system in a packet switching network employing the flow-control system according to the present invention when the flow-control mechanism is stopped.

The employment of the above-mentioned procedure enables the terminals to make the flow control without using special procedures for the flow control. If a system is employed where the sending terminal TA uses the final data to be transmitted with END representing that its associated data is final, and the receiving terminal LSA for receiving this data discriminates the final data representation END, it is unnecessary to transmit the next data incoming ready signal GA for the flow control into the switching network, thus resulting in improvement of the data processing ability of the switching network. That is, in this system, as shown in FIG. 7, even if the successively transmitted data is the Nth data DTN (END), the correct answer sender SAK promptly delivers the correct answer AK to the sending terminal TA, if the transmission controller TCA of the sending station LSA confirms the attachment of the final data representation END to the final data. At the same time, the sending station sends the data DTN (END) with the final data representation END to the receiving station LSB. On the other hand, in the receiving station LSB with the received data DTN (END), the data assembly counter is reset zero to permit the data sender SDTB to transmit the data DTN (END) to data DTN the receiving terminal TB. After the correct answer AK is received from the receiving terminal, the content of the data assembly counter ACNT is zero. For this, even if the checking answer received to the Nth data (END) is the correct answer, the receiving station does not send the next data incoming ready signal GA to the sending station LSA. This enables the reduction of the next data incoming ready signals GS transmitting between the sending and receiving stations LSB and LSA.

As described above, in the present invention, the flow control of the switching network is realized in such a way that the correct answer AK in the transmission control procedure from the sending station LSA to the sending terminal TA is held until the receipt of the next data incoming ready signal GA indicating that the data store buffer memory DBFB of the receiving station LSB is made empty. Therefore, no special procedure taken for the flow control by the switching network are necessary for the sending and receiving terminals TA and TB, and few additional signals for the flow control are required for the switching network. It will thus be seen that the present invention provides an economical packet switching network.

We claim:

1. A packet switching system comprising a packet switching network having office-to-office channels for connecting between packet switching offices, and data communication channels for connecting between data communication sending and receiving terminals and said packet switching offices;

wherein a data communication is conducted by a single communication link established prior to the beginning of the data communication, from one of said data communication sending terminals to one of said data communication receiving terminals through one of said office-to-office channels in accordance with a character oriented transmission control procedure, said single communication link being disconnected in accordance with said character oriented transmission control procedure after said data communication;

and wherein, after the establishment of said single communication link for transmitting a data block from said sending terminal to said receiving terminal through said packet switching network, a checking answer is provided in accordance with said transmission control procedure, said checking answer associated with the data block being transmitted from said packet switching office connected by said data communication channel to said data communication sending terminal; and after the transmission of said data block to said data communication receiving terminal, a checking answer is transmitted from said data communication receiving terminal in accordance with said transmission control procedure, said checking answer associated with the data block being received by said packet switching office connected by said data communication channel to said data communication receiving terminal to inhibit the transmission of said checking answer into said packet switching network.

2. A packet switching system according to claim 1, wherein each of said data blocks is assigned a number and further comprising a flow control comprising:

means for temporarily holding the transmission of the checking answer in said packet switching office in accordance with said transmission control procedure, said checking answer associated with the received data block from said data communication sending terminal, in order to stop a successive data block transmission from said data communication sending terminal when the number of the data block successively received by said packet switching office connected by said data communication channel to said data communication terminal reaches a predetermined value defined by said packet switching office;

means, located in said packet switching office, for detecting whether the next data block from said data communication sending terminals is receivable, and means for transmitting the checking answer, which has been temporarily held in said packet switching office, to allow the transmission of the next data block to said data communication sending terminal after said detecting means has detected the receivable state of the next data block.

3. A packet switching system according to claim 2, wherein if said data communication terminal transmits a signal to said packet switching office connected by said data communication channel to said data communication terminal, said signal representing the end of the data transmission and said signal being included in a final data block, in accordance with said transmission control procedure, then said packet switching office transmits a checking answer in accordance with said transmission control procedure, said checking answer associated with said received data block and transmitted to said data communication sending terminal after said packet switching office detecting means has detected said final data block, said checking means being transmitted independently of said flow control.

* * * * *